United States Patent Office 3,405,180
Patented Oct. 8, 1968

3,405,180
PROCESS FOR PREPARING TERTIARY
PHOSPHINES
Joseph G. Natoli, Parlin, N.J., assignor to M & T Chemicals Inc., New York, N.Y., a corporation of Delaware
No Drawing. Filed Feb. 3, 1964, Ser. No. 342,234
17 Claims. (Cl. 260—606.5)

ABSTRACT OF THE DISCLOSURE

In accordance with certain of its aspects, the process of this invention for reducing trihydrocarbon phosphorus oxide to trihydrocarbon phosphorus comprises reacting trihydrocarbon phosphorus oxide with a halo-complexing agent thereby forming an adduct of trihydrocarbon phosphorus dihalide with said agent; heating said adduct to its decomposition temperature of at least 105° C. in a halobenzene solvent having a melting point of less than about 55° C. and boiling point higher than said decomposition temperature and less than about 250° C. thereby separating trihydrocarbon phosphorus dihalide from said complex; and reducing said trihydrocarbon phosphorus dihalide with a metal reducing agent having an oxidation potential of 0.75 volt–2.5 volts thereby forming trihydrocarbon phosphorus.

---

This invention relates to the production of trihydrocarbon phosphorus compounds by the reduction of trihydrocarbon phosphorus oxides.

As is well known to those skilled in the art, trihydrocarbon phosphorus compounds, typified by triphenyl phosphorus, find use in a wide variety of processes; the ability of this typical compound to be selectively oxidized to triphenyl phosphorus oxide permits its use in processes wherein a particular group must be selectively reduced. Typical of such reactions may be the Wittig reaction wherein, e.g., a ketone or an aldehyde group may be converted into an olefin linkage. Other reactions are also known wherein triphenyl phosphorus may be employed which produce triphenyl phosphorus oxide as by-product. Although these reactions appear to possess a wide range of utility in the field of organic chemistry, commercial realization of this potential has been precluded by the high initial cost of triphenyl phosphorus and the inability to economically convert by-product triphenyl phosphorus oxide to triphenyl phosphorus. It has long been appreciated that commercial realization of many of these processes has only been impeded by the lack of a satisfactory technique whereby the by-product may be converted to the charge material.

It is an object of this invention to set forth a process for reducing trihydrocarbon phosphorus oxide to trihydrocarbon phosphorus. Other objects will be apparent to those skilled-in-the-art from inspection of the following description.

In accordance with certain of its aspects, the process of this invention for reducing trihydrocarbon phosphorus oxide to trihydrocarbon phosphorus comprises reacting trihydrocarbon phosphorus oxide with a halo-complexing agent thereby forming an adduct of trihydrocarbon phosphorus dihalide with said agent; heating said adduct to its decomposition temperature of at least 105° C. in a halobenzene solvent having a melting point of less than about 55° C. and boiling point higher than said decomposition temperature and less than about 250° C. thereby separating trihydrocarbon phosphorus dihalide from said complex; and reducing said trihydrocarbon phosphorus dihalide with a metal reducing agent having an oxidation potential of 0.75 volt–2.5 volts thereby forming trihydrocarbon phosphorus.

The material which may be treated in practice of this invention may be trihydrocarbon phosphorus oxide, $R_3PO$, which may be available in pure form or more commonly in crude form, e.g., in solvent, as recovered as by-product from some reaction. Trihydrocarbon phosphorus oxides, $R_3PO$, which may be used in practice of this invention, may include compounds wherein R may be alkyl, cycloalkyl, aryl, alkaryl, and aralkyl groups including such groups when inertly substituted. When R is an alkyl group, it may include methyl, ethyl, n-propyl, i-propyl, n-butyl, i-butyl, t-butyl, n-amyl, n-hexyl, 2-ethylhexyl, n-octyl, etc. When R is a cycloalkyl group, it may include cyclohexyl, cycloheptyl, etc. When R is an aryl group, it may include phenyl, naphthyl, etc. When R is an alkaryl group, it may include tolyl, xylyl, etc. When R is an aralkyl group, it may include benzyl, phenylethyl, w-phenylpropyl, p-chlorophenylpropyl, m-methoxyphenylethyl. All of the R groups need not be the same.

Triphenyl phosphorus oxide, the preferred charge material, may be characterized by its M.P. of 152° C.–153° C., its white color, and its analysis of 77.7% C, 5.44% H, 11.13% P, and 5.72% O. Other illustrative available charge materials which may be used in the process of this invention include, e.g., tri(4-chlorophenyl)-phosphorus oxide (platelets, M.P. 171.5° C.–172° C.); tri(4-tolyl)phosphorus oxide (M.P. 145° C., needles from benzene); and tributyl phosphorus oxide (B.P. 148° C.–155° C./0.35–0.7 mm. Hg), etc.

In practice of this invention according to its preferred aspects, the charge material, typically triphenyl phosphorus oxide, is reacted with a halo-complexing agent to convert the triphenyl phosphorus oxide to triphenyl phosphorus dihalide which is simultaneously converted to an adduct.

The halo-complexing agents which may be employed in practice of this invention may include thionyl chloride, and pentahalides of arsenic, antimony, and phosphorus. The preferred halo-complexing agent may be phosphorus pentachloride. Antimony pentabromide, antimony pentachloride, arsensic pentachloride, arsenic pentabromide, aresnic pentafluoride, and phosphorus pentachloride may also be employed. Mixed agents including phosphorus dibromide trifluoride may also be employed. These compounds may be well-known compounds.

The first step of the process of this invention in accordance with certain of its aspects may be effected by reacting, e.g., triphenyl phosphorus oxide with a halo-complexing agent, preferably phosphorus pentachloride.

In practice of this invention, it may be preferred to carry out this first step of the process in the presence of a halobenzene solvent preferably having a melting point of less than about 55° C. and a boiling point of less than about 250° C., i.e., a solvent which is in liquid phase in the range of about 55° C.–250° C. The halobenzene solvent employed will preferably be one which has a boiling point higher than the decomposition temperature of the adduct of trihydrocarbon phosphorus with the halo-complexing agent. These halobenzene solvents employed are inert, i.e., not react with the reactants including, e.g., aluminum chloride or products of this step or subsequent steps.

Typically the halobenzene solvent having the noted melting and boiling point may be: a monohalobenzene such as monochlorobenzene or monobromobenzene; a dihalobenzene such as ortho-dichlorobenzene, ortho-dibromobenzene, meta-dichlorobenzene, meta-dibromobenzene, para-dichlorobenzene; a trihalobenzene such as 1,2,3-trichlorobenzene and 1,2,4-trichlorobenzene. Liquid mixtures of halobenzenes such as commercial mixtures of isomers of dichlorobenzene or dibromobenzene or trichlorobenzene may be employed. Mixtures of e.g., 1,2,3-trichlorobenzene and 1,3,5-trichlorobenzene, or mixtures of, e.g., ortho-dibromobenzene and para-dibromobenzene otherwise characterized as noted supra may be employed.

The preferred halobenzene solvent may be those containing chlorine. It is found that particularly outstanding results are obtained when the halobenzene solvent is ortho-dichlorobenzene either in pure form, or in commercial form containing minor amounts of other isomers including the meta-isomer or the para-isomer.

It is a feature of this invention that inertly substituted halobenzenes, i.e., those containing on the benzene ring inert substituents such as alkyl, preferably lower alkyl groups may be employed. Typical of such inertly substituted benzenes may be chlorotoluenes such as ortho-chlorotoluene, meta-chlorotoluene, para-chlorotoluene, 2,4-dichlorotoluene, etc., and chloro xylenes such as 3-chloro, 1,2-dimethylbenzene; 4-chloro, 1,3-dimethylbenzene; 3-bromo, 1,4-dimethylbenzene, etc.

The reactants react typically as follows, i.e., when the starting material is e.g., triphenyl phosphorus oxide:

$$\phi_3PO + A \rightarrow (\phi_3PX_2) \rightarrow \phi_3PX_2 \cdot A' \quad (1)$$

In this equation, as elsewhere in this specification, the symbol $\phi$ stands for the phenyl radical, $C_6H_5$. In this reaction, the triphenyl phosphorus oxide $\phi_3PO$ may react with the halo-complexing agent A to form the triphenyl phosphorus dihalide, $\phi_3PX_2$, which adds to or complexes immediately with the moiety A' of the complexing agent which moiety now lacks the two halide groups $(X_2)$ which have replaced the oxygen of the oxide. The compounds typified by $\phi_3PX_2 \cdot A'$, addition products or complexes, may be referred to as adducts. According to illustrative examples showing reaction with different halo-complexing agents:

$$2\phi_3PO + 2PCl_5 \rightarrow (\phi_3PCl_2)_2 \cdot POCl_3 + POCl_3 \quad (2)$$

$$2\phi_3PO + 2SOCl_2 \rightarrow (\phi_3PCl_2)_2SO_2 + SO_2 \quad (3)$$

This reaction is carried out in yields which is above about 92% and which typically approach stoichiometric.

It is a particular feature of this invention that the reaction of the first step typified by Equation 1 supra, when carried out in the presence of the halobenzene solvents hereinabove disclosed, requires substantially no effective residence time or no elevation of temperature other than that occuring during heating immediately preceding the decomposition hereinafter set forth. It is a further feature of this invention that the so-formed adduct $\phi_3PX_2 \cdot A'$, if recovered in pure form from the reaction mixture, is unexpectedly stable at elevated temperatures either at atmospheric pressure or subatmospheric pressure.

Decomposition of the adduct, e.g., $\phi_3PX_2 \cdot A'$ in practice of certain aspects of this invention, is effected by heating said adduct to at least its decomposition temperature in the presence of a halobenzene solvent preferably having a boiling point higher than said decomposition temperature. Typically the decomposition temperature is at least about 105° C. and preferably less than 240° C., preferably 110° C.–150° C. The boiling point (at atmospheric pressure) of the preferred diluent is less than 250° C. and 130° C.–250° C., preferably 170° C.–185° C., say 183° C. The diluent may preferably be the same diluent as that used in the first step of the reaction. Decomposition is carried out over typically a period of 60–240 minutes, say 120 minutes.

Decomposition typically occurs as follows:

$$\phi_3PX_2 \cdot A' \rightarrow \phi_3PX_2 + A' \quad (4)$$

and illustratively:

$$(\phi_3PCl_2)_2 \cdot POCl_3 \rightarrow 2\phi_3PCl_2 + POCl_3 \quad (5)$$

Decomposition is effected by heating the adduct in the presence of halobenzene solvent. Although in the preferred embodiment, the decomposition is effected in the presence of the same solvent as was present in the first step, desired amounts of another selected solvent may be added. Preferred solvent is ortho-dichlorobenzene. Preferably the solvent is present in the second step in amount sufficient to permit attainment of a workable mixture in the reaction vessel. The mixture is heated to a temperature of preferably at least about 105° C., and less than 250° C., and preferably 110° C.–250° C. As the temperature rises to and remains at this level typically over 60–240, say 120 minutes, the solvent, typically ortho-dichlorobenzene, and the compound A', typically phosphorus oxychloride, distills over and is recovered. The residue from the distillation includes substantially pure trihydrocarbon phosphorus dihalide, e.g., triphenyl phosphorus dichloride.

A typical illustrative reaction wherein a trihydrocarbon phosphorus oxide is converted to trihydrocarbon phosphorus dihalide in accordance with this first step is one wherein 278 parts (1.0 mole) of triphenyl phosphorus oxide (B.P. 148° C.–155° C./0.35–0.7 mm. Hg), may be charged to a flask equipped with Vigreux column, total condensation take-off head, thermo-well, and nitrogen inlet. 1475 parts of ortho-dichlorobenzene are added and the mixture heated until 40 parts of orthodichlorobenzene be driven off, thus insuring that the residue is dry, any water present having been azeotroped by the preliminary distillation.

The reaction mixture is cooled to 90° C. and 234.3 parts (1.125 mole) of phosphorus pentachloride added in small batches over 20 minutes. The mixture is heated to distill ortho-dichlorobenzene and by-product phosphorus oxychloride until the distillate temperature reaches 178° C. (pot temperature 183° C.) and phosphorus oxychloride is no longer detected in the distillate (by its characteristic odor and/or by silver nitrate test).

The so-prepared residue trihydrocarbon phosphorus dihalide, typically triphenyl phosphorus dihalide, is reduced to triphenyl phosphorus in accordance with certain aspects of this invention by the following illustrative reaction:

$$3\phi_3PX_2 + M \rightarrow 3\phi_3P + MX \quad (6)$$

and typically:

$$3\phi_3PCl_2 + 2Al \rightarrow \phi_3P + 2AlCl_3 \quad (7)$$

In practice of this invention according to certain of its aspects, reduction is effected by means of a metal reducing agent having an oxidation potential (q.v., the Electromotive Series Table-Chart of W. H. Latimer, pub. 1956 by W. M. Welch Mfg. Co.) of 0.75 volt–2.5 volts. Typical of such metals are zinc 0.76 volt, maganese 1.18 volts, aluminum 1.66 volts, and magnesium 1.66 volts. The preferred metal is aluminum. Such metals which may serve as mild reducing agents to permit attainment of the desired results of this invention, are used in bulk or in finely divided form including turnings. When aluminum is employed, it is in the form of the so-called aluminum powder, which is a very finely divided form of the metal typically having an average particle size such that it will pass through 200–300 mesh. If zinc metal be employed, it is employed in the form of powdered zinc or mossy zinc. As will be apparent to those skilled in the art, the metal is present in amount greater than the stoichiometric amount, e.g., in the case of the preferred aluminum 0.66 mole of aluminum per mole of the dihalide. Preferably reduction is carried out by adding to the, e.g., triphenyl phosphorus dihalide (preferably the dichloride) at least an amount of metal sufficient to combine with the halogen atoms present, and preferably from 10%–100%, say 50% excess.

In practice of the reduction according to a preferred embodiment, 100 parts by weight of the triphenyl phosphorus dihalide are mixed with 100–500, say 300 parts by weight of a halobenzene solvent. Typical halobenzene solvent which is employed may include halobenzene solvents used in the first step supra preferably ortho-dichlorobenzene, etc. Preferably the same solvent is used as was used in the first step. Preferably the mixture of triphenyl phosphorus dihalide, aluminum powder, and halobenzene solvent is heated, with agitation, under reflux, for 20–60 minutes, typically 30 minutes, until the vigorous exothermic reaction subsides. In the preferred embodiment, the dihalide is added slowly over 150–200 minutes, say 180 minutes to the mixture of metal and halobenzene solvent during refluxing. During refluxing, temperature of the reaction mixture is substantially the boiling point of the solvent. At the end of this time, the reaction mixture is cooled to 50° C.–60° C. and filtered to remove unreacted metal, typically aluminum. The organic filtrate may preferably then be washed with water, optionally containing sodium chloride, to remove aluminum chloride. The organic layer may then be filtered or clarified typically by passage through a bed of Dicalite. The organic layer may then be stripped of halobenzene solvent, typically by heating under vacuum to distill off the solvent. The residue may be substantially pure triphenyl phosphorus which is recovered. If desired, further purification may be effected.

When the desired product phosphine produced by the reaction of the dihalide with the metal is one which may be sensitive to heat, as may be the case with the alkyl, particularly the lower alkyl, derivatives, the trihydrocarbon phosphorus is recovered from the solution in the solvent by extraction with an aqueous solution of quaternizing agent, typically hydrogen chloride. Preferably concentrated aqueous hydrochloric acid is employed. The trihydrocarbon phosphorus is extracted in and by the solution typically as, e.g., the trihydrocarbon phosphonium chloride. This solution is separated from the organic layer and then treated with base, typically ammonium hydroxide or sodium hydroxide to neutralize the quaternary salt and liberate the free trihydrocarbon phosphorus which is filtered from the aqueous medium. Typically product is obtained in yields of 70%–100%, say 90%, based upon the charge trihydrocarbon phosphorus oxide.

The product trihydrocarbon phosphorus is characterized by the following illustrative properties: triphenyl phosphorus light-to-white solid, M.P. 79° C.–80° C.; tri(4-chloro-phenyl)phosphorus, M.P. 103° C.; tri(4-tolyl)-phosphorus prismatic crystals, M.P. 146° C.; tributyl phosphorus, liquid B.P. 149.5° C./50 mm. Hg and 129° C.–130° C./22 mm. Hg.

Practice of this invention is more readily observed by inspection of the following illustrative examples.

EXAMPLE 1

737 parts (5 moles) of ortho-dichlorobenzene and 111.2 parts (0.4 mole) of triphenyl phosphorus oxide were charged to a reaction vessel which was heated to distill off 15 parts of solvent, together with any water present, thereby insuring an anhydrous system. 91.5 parts (0.44 mole) of phosphorus pentachloride were added to the reaction vessel at 25° C.–50° C. The temperature rose due to the exothermic nature of the following reaction:

$$2\phi_3PO + 2PCl_5 \rightarrow (\phi_3PCl_2)_2 \cdot POCl_3 + POCl_3 \quad (8)$$

The reaction mixture was distilled until the temperature rises until 178° C.–180° C. and phosphorus oxychloride was no longer noted in the distillate. The distillate was 124 parts of ortho-dichlorobenzene containing phosphorus oxychloride. During this distillation, the adduct was decomposed leaving triphenyl phosphorus dichloride as residue according to the following reaction:

$$(\phi_3PCl_2)_2 \cdot POCl_3 \rightarrow 2\phi_3PCl_2 + POCl_3 \quad (9)$$

There was added to the residue triphenyl phosphorus dichloride, 12 parts (0.44 mole) of aluminum powder and the mixture was heated to reflux for 180 minutes. During this period, the reduction proceeded according to the following equation:

$$3\phi_3PCl_2 + 2Al \rightarrow 3\phi_3P + 2AlCl_3 \quad (10)$$

At the end of this time, the reaction mass was cooled to 50° C.–55° C. and filtered under suction through a bed of Dicalite to remove aluminum chloride and unreacted aluminum. The filter cake was washed with additional ortho-dichlorobenzene which was combined with the filtrate. The filtrate was stripped of ortho-dichlorobenzene by distillation at 20–30 mm. Hg until the pot temperature rose to 150° C.

The residue was cooled to 120° C. and mixed with 170 parts of methanol with agitation. The mixture was then cooled to 20° C. and filtered, the filter cake being methanol-washed and air dried.

The yield of triphenyl phosphine was 89 parts (86% yield) of product having a melting point of 79° C.–80° C. On analysis, the product was found to contain 12.11% phosphorus (11.8% calc.).

EXAMPLE 2

584 parts (3.2 moles) of 1,2,4-trichlorobenzene and 111.2 parts (0.4 mole) of triphenyl phosphorus oxide were charged to a reaction vessel which was heated to distill off 51 parts of solvent together with any water present thereby insuring an anhydrous system. 91.5 parts (0.44 mole) of phosphorus pentachloride were added to the reaction vessel at 25° C.–50° C. The temperature rose due to the exothermic nature of the following reaction:

$$2\phi_3PO + 2PCl_5 \rightarrow (\phi_3PCl_2)_2 \cdot POCl_3 + POCl_3 \quad (11)$$

The reaction mixture was distilled until the temperature rose to 183° C. and phosphorus oxychloride was no longer noted in the distillate. The distillate was 69 parts of 1,2,4-trichlorobenzene containing phosphorus oxychloride. During this distillation, the adduct was decomposed, leaving triphenyl phosphoric dichloride as residue according to the following reaction:

$$(\phi_3PCl_2)_2 \cdot POCl_3 \rightarrow 2\phi_3PCl_2 + POCl_3 \quad (12)$$

There was added to the residue triphenyl phosphorus dichloride, 12 parts (0.44 mole) of aluminum powder; and the mixture was heated to reflux for 180 minutes. During this period the reduction proceeded according to the following equation:

$$(\phi_3PCl_2)_2 + 2Al \rightarrow 3\phi_3P + 2AlCl_3 \quad (13)$$

At the end of this time, the reaction mass was cooled to 50–55° C., and filtered under suction through a bed of Dicalite to remove aluminum chloride and unreacted aluminum. The filter cake was washed with additional 1,2,4-trichlorobenzene which was combined with the filtrate. The filtrate was stripped of 1,2,4-trichlorobenzene by distillation at 20–30 mm. Hg until the pot temperature rose to 160° C.

The residue was cooled to 120° C. and mixed with 170 parts of methanol with agitation. The mixture was then cooled to 20° C. and filtered, the filter cake being methanol-washed and air dried.

The yield of triphenylphosphine was 80 parts (78% yield) of product having a melting point of 79° C.

As many embodiments of this invention may be made without departing from the spirit and scope thereof, it is to be understood that the invention includes all such modifications and variations as come within the scope of the appended claims.

I claim:

1. The process for reducing trihydrocarbon phosphorus oxide to trihydrocarbon phosphorus which comprises reacting trihydrocarbon phosphorus oxide with a halo-complexing agent thereby forming an adduct of trihydrocarbon phosphorus dihalide with said agent in which 2 halogens have been replaced by an oxygen atom; heating said adduct to its decomposition temperature of at least 105° C. in a halobenzene solvent having a melting point of less than about 55° C. and a boiling point higher than said decomposition temperature and less than about 250° C. thereby separating trihydrocarbon phosphorus dihalide from said adduct; and reducing said trihydrocarbon phosphorus dihalide with a metal reducing agent having an oxidation potential of 0.75–2.5 volts thereby forming trihydrocarbon phosphorus.

2. The process for reducing trihydrocarbon phosphorus oxide to trihydrocarbon phosphorus as claimed in claim 1 where said halobenzene is a dihalobenzene.

3. The process for reducing trihydrocarbon phosphorus oxide to trihydrocarbon phosphorus as claimed in claim 1 wherein said halobenzene is a dichlorobenzene.

4. The process for reducing trihydrocarbon phosphorus oxide to trihydrocarbon phosphorus as claimed in claim 1 wherein said halobenzene is ortho-dichlorobenzene.

5. The process of claim 1 wherein said trihydrocarbon phosphorus oxide is a triaryl phosphorus oxide.

6. The process of claim 1 wherein said trihydrocarbon phosphorus oxide is triphenyl phosphorus oxide.

7. The process of claim 1 wherein said halo-complexing agent is selected from the group consisting of thionyl chloride, and pentahalides of arsenic, antimony, and phosphorus.

8. The process of claim 1 wherein said halo-complexing agent is phosphorus pentachloride.

9. The process of claim 1 wherein said halo-complexing agent is thionyl chloride.

10. The process of claim 1 wherein said adduct is heated to approximately the boiling point of the diluent thereby separating trihydrocarbon phosphorus dihalide from said adduct.

11. The process of claim 1 wherein said adduct is heated to 110° C.–150° C. thereby separating trihydrocarbon phosphorus dihalide from said adduct.

12. The process for reducing triphenyl phosphorus oxide to triphenyl phosphorus which comprises reacting triphenyl phosphorus oxide with a halo-complexing agent selected from the group consisting of thionyl chloride, and pentahalides of arsenic, antimony, and phosphorus thereby forming an adduct of triphenyl phosphorus dihalide with said agent in which 2 halogens have been replaced by an oxygen atom; heating said adduct to its decomposition temperature of at least 105° C. in a halobenzene solvent having a melting point of less than about 55° C. and a boiling point higher than said decomposition temperature and less than about 250° C. thereby separating triphenyl phosphorus dihalide from said adduct; and reducing said trihydrocarbon phosphorus dihalide with a metal reducing agent having an oxidation potential of 0.75–2.5 volts thereby forming triphenyl phosphorus.

13. The process of claim 12 wherein said halo-complexing agent is phosphorus pentachloride.

14. The process of claim 12 wherein said diluent is an inert hydrocarbon.

15. The process of claim 12 wherein said adduct is heated to 110° C.–150° C. thereby separating triphenyl phosphorus dihalide from said adduct.

16. The process for reducing a triphenyl phosphorus oxide to triphenyl phosphorus which comprises reacting triphenyl phosphorus oxide with phosphorus pentachloride thereby forming the phosphorus oxychloride adduct of triphenyl phosphorus dichloride; heating said adduct to its decomposition temperature of at least 105° C. in a halobenzene solvent having a melting point of less than about 55° C. and a boiling point higher than said decomposition temperature and less than about 250° C. thereby separating triphenyl phosphorus dichloride from said adduct; and reducing said triphenyl phosphorus dichloride with a metal reducing agent having an oxidation potential of 0.75–2.5 volts thereby forming triphenyl phosphorus.

17. The process for reducing triphenyl phosphorus oxide to triphenyl phosphorus which comprises reacting triphenyl phosphorus oxide with phosphorus pentachloride thereby forming the phosphorus oxychloride adduct of triphenyl phosphorus dichloride; heating said adduct to 110° C.–150° C. in ortho-dichlorobenzene solvent thereby separating triphenyl phosphorus dichloride from said adduct; and reducing said triphenyl phosphorus dichloride with a metal reducing agent having an oxidation potential of 0.75–2.5 volts.

References Cited

UNITED STATES PATENTS 3,280,195  10/1966  Fritzsche _____ 260—606.5

OTHER REFERENCES

Wendlandt, Chem. Abstracts, vol. 53 (1959), p. 15843(F).

Som, Chem. Abstracts, vol. 55 (1961), p. 19416(E).

K.L.C., Chem. Abstract, vol. 55 (1961), p. 24354(a).

TOBIAS E. LEVOW, *Primary Examiner.*

W. F. W. BELLAMY, *Assistant Examiner.*